United States Patent [19]

Pierce et al.

[11] Patent Number: 4,598,196
[45] Date of Patent: Jul. 1, 1986

[54] DEBIT CARD

[75] Inventors: Gerald A. Pierce, Redwood City; Gregory K. Myers, San Francisco, both of Calif.

[73] Assignee: Drexler Technology Corporation, Mountain View, Calif.

[21] Appl. No.: 629,368

[22] Filed: Jul. 10, 1984

[51] Int. Cl.[4] .............................................. G06K 7/10
[52] U.S. Cl. .................................... 235/454; 235/457; 235/466; 235/477
[58] Field of Search ................ 235/454, 457, 466, 477

[56]  References Cited

U.S. PATENT DOCUMENTS

| 3,819,829 | 6/1975 | Dobras | 235/466 |
| 3,873,813 | 3/1975 | Lahr et al. | |
| 4,172,554 | 10/1979 | Clarinval et al. | 235/466 |
| 4,280,037 | 7/1981 | Schmidhauser | 235/454 |
| 4,304,848 | 12/1981 | Bouldin et al. | 430/401 |

FOREIGN PATENT DOCUMENTS 1442883 7/1976 United Kingdom .

*Primary Examiner*—Harold I. Pitts

[57] ABSTRACT

An optical information-bearing debit card having servo tracks and calibration works on a recording medium for aligning a reading or writing light beam with a nearby value site area. The medium is an elongated strip of reflective information storage material adhered to a self-supporting card, like a credit card. The value site area may be decremented by the light beam changing the optical characteristics of the recording medium. The servo tracks are lengthwise, parallel to the long dimension of the strip of recording material while the calibration marks are non-continuous marks, aligned in a track parallel to the servo tracks. Tracks and calibration marks are disposed on the card so that the value area can be read bidirectionally starting from either end of the card.

12 Claims, 5 Drawing Figures

DEBIT CARD

DESCRIPTION

1. Technical Field

The invention relates to data cards and more particularly to data cards for use as optically recordable consumable debit cards.

2. Background Art

Consumable debit cards are used to provide a system for prepaid goods or services in which value sites on a card are decremented as the goods are bought or services are used. Most optical recording debit cards of the prior art have several discrete areas, each of which represents a certain percentage of the total card value and which are erased or cancelled by a radiation source individually as used.

Value areas are cancelled or erased on optically recordable cards by means of radiation energy which changes the optical characteristic of the recordable surface such as that described in U.S. Pat. No. 3,873,813 to Lahr et al. wherein heating of a coating by a high intensity light beam for less than one second darkens and permanently changes the spectral reflective characteristics and provides a visual indication of decremented and remaining credit worth of the card. The authenticity of the card is verified by measurement of amplitudes of three colors reflected from the coating. Detection of unused value sites on this card requires an authenticity check before either decrementing that unused site or moving on to another area. Since the discrete areas are each worth a certain value, sequential decrementing of several adjacent value sites without stopping to make authenticity checks of each area would not be advisable. Provision must be made in this card for absorbing liquids since the coating changes to a transparent liquid on heating. Either a visual orientation or a keyway must be used to orient the value site tracks in a reader/writer.

Discrete areas on prior art cards equivalent to certain value amounts on the card were provided so as not to require transport calibration devices. The discrete areas were separated by guard areas or gaps to isolate them for recording one at a time. In U.S. Pat. No. 4,280,037 to Clarinval et al., a card eliminates the need for either gaps or a separate timing track by having value sites of two different optical markings in alternating sequence without spacing or gaps between. Transition regions at the end of one mark or the beginning of the next are detected by two light sensors associated with each of the two types of marks. Decrementing of value sites on this card requires the detection of the transition zone at the edges of unused value units. Then the value unit is erased. A read head then detects the next unerased transition zone, stops the transport, reverses, erases the next value site. This sequence is repeated until the desired payment is erased. The reading head and the erasing head are separate units. There is no provision for a continual reading and erasing of value sites.

Consumable debit cards, due to their frequent use, are subject to surface abrasion and dirt which cause obliteration of the value sites on the card and prevent accurate determination of the true remaining value of the card.

It is therefore the object of the invention to devise a consumable debit card in which unused value sites are easily and quickly detected and subsequently erased in a continuous rather than a discrete manner by a single energy source and detector means. It is another object of the invention to devise a consumable debit card such that surface wear and tear would not destroy the information on the card regarding used and remaining values.

DISCLOSURE OF THE INVENTION

The above objects have been met by a preformatted optically recordable debit card having rows of servo tracks, value site tracks in a value site area and calibration marks set so as to provide simultaneous track and calibration during recording of decremented value sites. Value site tracks on the card are easily aligned for reading or writing by the parallel servo tracks. The value sites are located in a continuous track rather than discrete areas, thereby necessitating only one locating reading step before decrementing the total desired amount. Calibration marks located at intervals parallel to the value site tracks provide a measure of the value of the particular increments of the value site tracks. Pairs of servo tracks and value site tracks are set so as to provide for redundant recording in opposing directions. Calibration marks are of a width such that each calibration mark may be used to measure either one of the two redundant value site tracks. Beginning each value site track from opposite ends of the card insures a redundant recording of the decremented values with a high improbability that a scratch will affect the duplicate recording of both ends. The pair of redundant value site tracks are set side-by-side so that recording and reading equipment does not have to be mechanically moved across the card from track to track.

The consumable debit card may be read by means of a reader/writer system which employs a mechanical transport to move the card relative to an optical system having a radiation energy source and a detector array. A single laser beam is split into three beams for following calibration marks, servo tracks, and value site tracks respectively. The card is moved horizontally on a card transport until a middle reading/recording beam detects an undecremented area in the value site track. Motion is temporarily slowed and then resumed until the desired amount is erased from the value site track by means of increasing the energy from the reading-/recording beam. This amount is measured by the presence of the parallel calibration marks with interpolation between the marks accomplished by means of a grating system on the card transport. Desired amounts of value may be decremented by means of accurate measurement by a grating system with reference to the calibration marks.

One side beam of the three beams follows the servo track and the other side beam reads the calibration marks during the reading and recording procedures. Values are erased from the value site track so as to form either rows of spots or continuous trenches of decremented values. In the preferred embodiment the preformatted servo tracks and calibration marks and value site tracks are formed of reflective material and decrementing is accomplished by decreasing the reflectivity in recorded spots on the tracks. In an alternate embodiment the preformatted areas are either transparent or opaque on a film substrate with the decrementing of value sites accomplished by bleaching or darkening by a laser. After the desired amount of value is decremented from one value site track the transport moves the card to the opposite end and the procedure is repeated from that end on a parallel value site track, the middle beam of the three beams reading or recording, one side beam following a parallel servo track and the other side beam impinging on an edge of the calibration marks. A tracking mirror in the optical system repositions the three beams to the redundant value site track, servo track, and calibration mark. Provision can be made on the card for several bands of servo tracks, calibration marks and redundant value site tracks.

Since the decrementing of value sites is accomplished by a change in the optical characteristics of the track relative to a background area of contrasting optical characteristics, it would be hard to forge value on the card by restoring the decremented areas to achieve the exact optical characteristic contrasts relative to the remaining background. Values on the card would not be completely destroyed by a scratch in one area of the card since the redundant value site track provides duplicate information on another area of the card. The presence of the visual calibration marks allows an approximation of the remaining value on the card by means of a visual matching up of the optically changed area with a particular calibration mark. The use of the card is accomplished by simple optical mechanical systems. Since the area decremented need only be a few microns wide the optical recording material need only occupy a small area on the card while still providing sufficient value sites for most uses. The compact arrangement of the servo tracks, value site tracks and calibration marks permits the use of a single laser source for accomplishing tracking, recording and reading. Since the cards are read by detecting differences in an optical characteristic of the material when recorded, simple detector means may be employed such as a multi-element photodiode array.

BEST MODE FOR CARRYING OUT THE INVENTION

Figure 1:
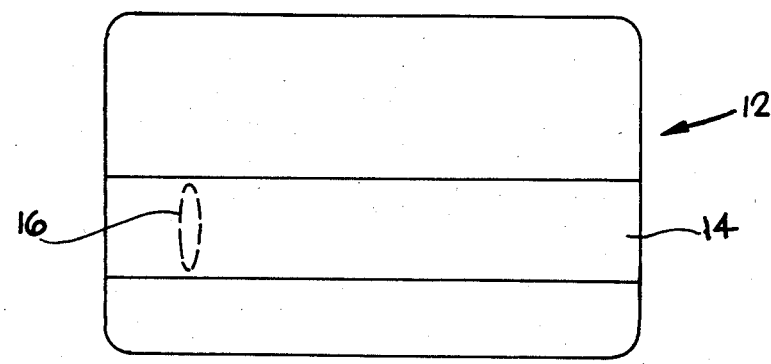
FIG. 1 is a front plan view of a preformatted optically recordable consumable debit card in accord with the present invention.

With reference to FIG. 1, a consumable debit card 12 is shown. On the surface of the debit card is inserted a strip of preformatted optical recording material 14 which may cover part or the entire surface of the debit card. In the preferred embodiment, the optical recording material used on the card is a direct-read-after-write reflective recording material as described in U.S. Pat. Nos. 4,269,917, 4,284,716, and 4,363,870, all assigned to the assignee of the present invention. This material is characterized by reflective silver particles in a gelatin matrix. Recording on this material is accomplished both by laser writing and by photographic prerecording of information. Recording by laser writing is accomplished by softening of the gelatin matrix by laser energy and subsequent deformation of the reflective silver surface layer causing lowering of the level of reflectivity from the recorded spot. Photographic prerecording of information on this material may be accomplished by the exposure to actinic radiation through pattern masks and subsequent developing of the patterns.

U.S. Pat. No. 4,304,848 describes the process for replication of the recording medium which may be used in an inverse process such that preformatted areas on the debit card are reflective against a dark background. An exposed silver-halide emulsion may be exposed to an opaque master having the desired format as opaque areas against clear background. The exposed areas are developed black color but not fixed. Next, the surface of the remaining unexposed silver-halide emulsion is fogged to create silver precipitating nuclei. The fogged emulsion is exposed to a monobath, containing a weak silver-halide developing agent and a silver-halide solvent, which slightly chemically develops the nuclei and reacts with the undeveloped silver halide to form soluble silver complexes which are transported by diffusion transfer to the silver precipitating nuclei where the silver in the complexes is precipitated and reduced so as to create a reflective silver surface. The desired preformatted areas will appear reflective against a dark background.

In an alternate embodiment the optical recording material may be a preformatted, exposed and developed film having clear transmissive or black opaque areas defining the format for the debit card. Recording or decrementing is accomplished by either bleaching or darkening.

Figure 2:
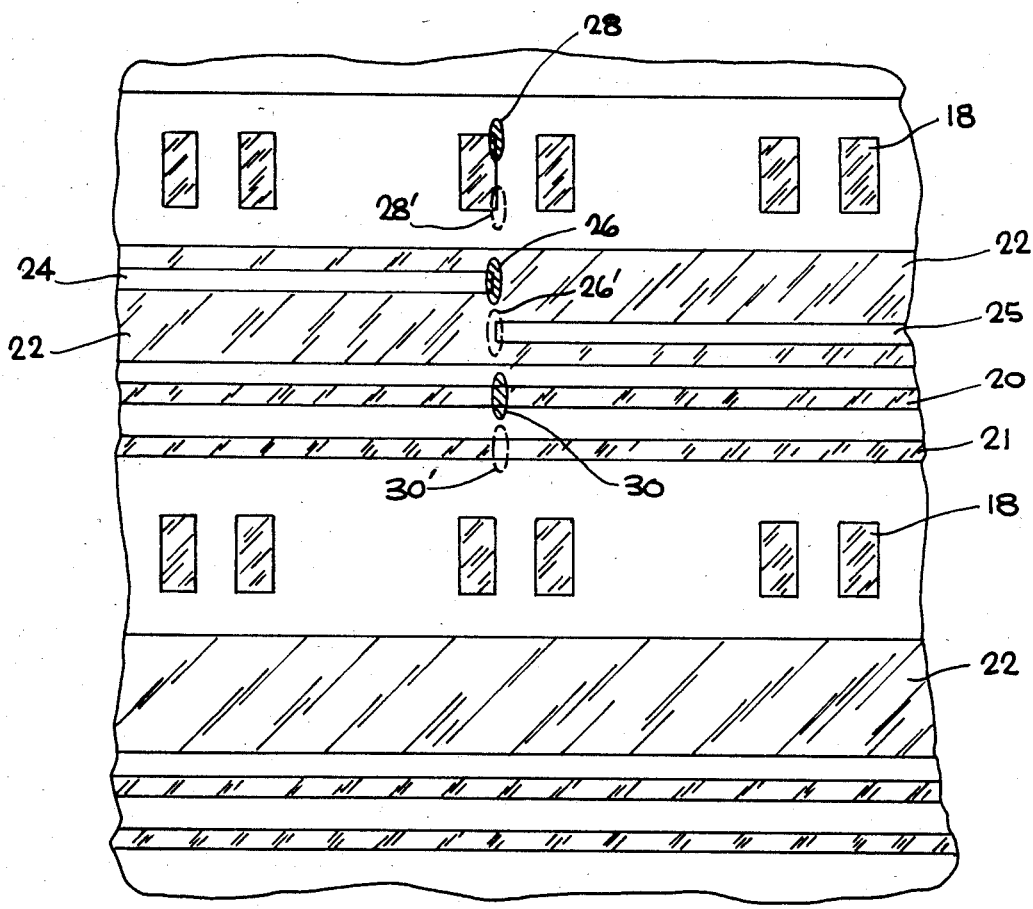
FIG. 2 is an enlarged detail of a preformatted optically recordable area illustrated in FIG. 1.

FIG. 2 shows the format of debit card data areas. Preformatted, optically detectable calibration marks 18 and servo tracks 20 and 21 are placed on either side of an optically recordable value site area 22. Preformatted calibration marks, servo tracks, and value site area are preferably reflective against a non-reflective background. In the preferred embodiment, the servo tracks are set in pairs parallel to, and slightly spaced from, the value site area. The calibration marks are oblong bars with the greatest length set perpendicular to the value site area. The value site area 22 is of a width to provide for two adjacent recordable value site tracks. Thus the width of the value site area is equal to the width of several value site tracks. The width of a single value site track corresponds to the diameter of the central portion of a laser beam, similar to a servo track. The calibration marks are wider, having a width of a few beam diameters.

In the preferred embodiment, the optically recordable material has a plurality of data areas, 22, each data area providing space for recording two pairs of redundant value site tracks, each single track containing 8,000 debit sites of 10 by 8 micron size. Of course, a track could contain a greater or lesser number of sites and each site could have different dimensions. While two pairs of value site tracks are described, any number of value site areas and tracks may be employed. Servo tracks 20 and 21 are narrow optically readable bars running the length of the card, adjacent to, parallel to, and slightly spaced from the value site area. The calibration marks 18 lie perpendicular to and on the other side of the value site area from the servo tracks. The placement of calibration marks with a long dimension perpendicular to the value site area permits use of the same calibration mark for recording in two redundant tracks, with the three beams in the same relative position. The calibration marks are typically formatted as adjacent pairs with each pair spaced apart from other adjacent pairs, the format repeating along the length of the card in certain increments denoting value units.

A track 24 of decremented value sites has been recorded in the reflective value site area 22 from the left side of the card. The decremented track is shown as a solidly erased track but may consist of a track of pits or holes. Use of a three-beam optical system places a middle reading/recording beam 26 on the value site area by means of two side tracking beams 28 and 30. One tracking beam 30 follows servo tracking mark 20. The other side tracking beam 28 follows calibration marks 18. The servo tracking marks provide an automatic alignment means to place the middle read/write beam so as to read and write in a continuous narrow track in the value site area eliminating the need for separate detection means to locate and authenticate discrete decremented and unused value sites as in the prior art. Value site tracks are always read prior to decrementing. The calibration marks are read at the same lengthwise point of travel as the reading/recording beam, allowing an accurate decrementing of the desired amount. When the desired decremented amount is recorded in one track a transport moves the card to the opposite end and a tracking mirror deflects the three beams until the parallel servo tracking mark 21 is detected. The transport then reverses direction and the debit card is moved so that a redundant value track 25 may be decremented from the right edge of the card. Relocated beam 30, now designated beam 30', tracks along servo tracking mark 21 and beam 28 tracks along the bottom edge of the calibration marks 18, shown by dashed line 28'. The desired amount is now decremented from track 25 by beam 26, the relocated beam designated beam 26', providing a redundant record of the amount decremented. Since this redundant record is not vertically aligned with the first record, there is less likelihood that surface vertical scratches will eliminate both records. While this description indicates one sequence of decrementing redundant tracks, an opposite sequence could be used.

Figure 3:
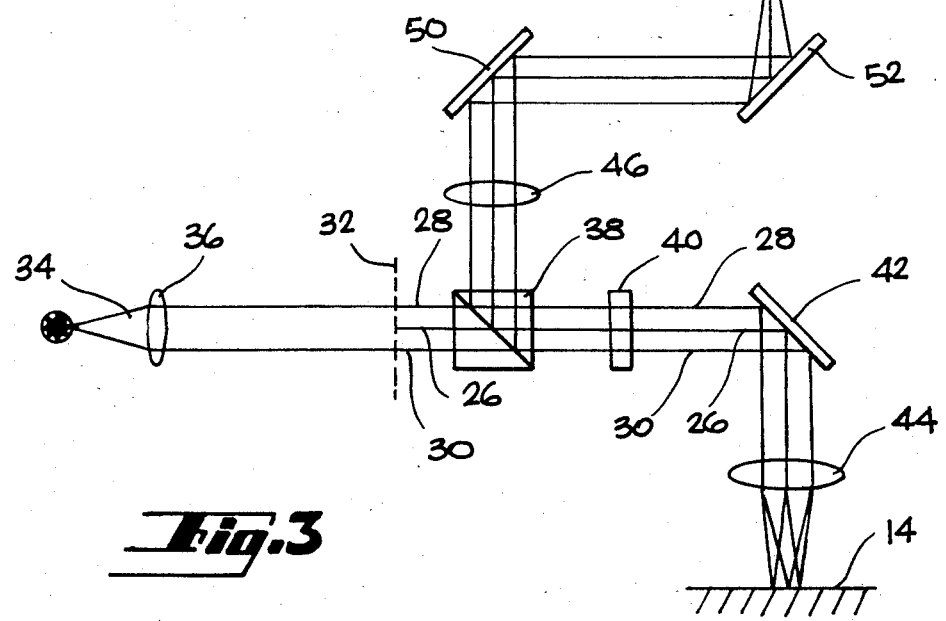
FIG. 3 is a schematic diagram of an optical system used with the debit card of the present invention.

In FIG. 3 the optical three-beam system is shown to be derived from a single laser beam, and the spacing of the resultant three beams for tracking, reading, and recording is accomplished by a diffraction grating 32. A source of radiation energy such as a laser, generates a beam 34, focused by lens 36 onto diffraction grating 32 where it is split into three spaced-apart beams, 26, 28, 30, having an unequal distribution of power. The ratio is about 1:6:1 for the three beams with middle beam 26 having the higher power and the side beams 28 and 30 having the lesser power. A beam splitting prism 38 transmits the three beams through a quarter wavelength plate 40 to tracking mirror 42 which controls the crosswise position of the three beams to make a redundant recording in the adjacent tracks and then through focusing lens 44 to the optical recording surface 14. The center beam 26 reads or writes the value site track and the two side beams are used to calibrate the card and guide the position on the correct track. The prism also redirects reflected light from the optical recording surface through magnifying lens 46 to a photodetector such as a multi-element PIN photodiode array 48 by means of mirrors 50 and 52. Light reflected by the optical recording material containing the calibration marks, servo tracks and value site area is focused by means of lens 46 to an array of photodetectors 48 for purposes of repositioning the beams in response to the servo tracking information and detecting calibration marks and undecremented value sites in the value site area. The intensity of this measured radiation is transmitted to a feedback system in order to maintain the beams on the various track marks. Typically the detector provides a servo error signal which is used for crosswise repositioning of the focused beam spots.

Figure 4:
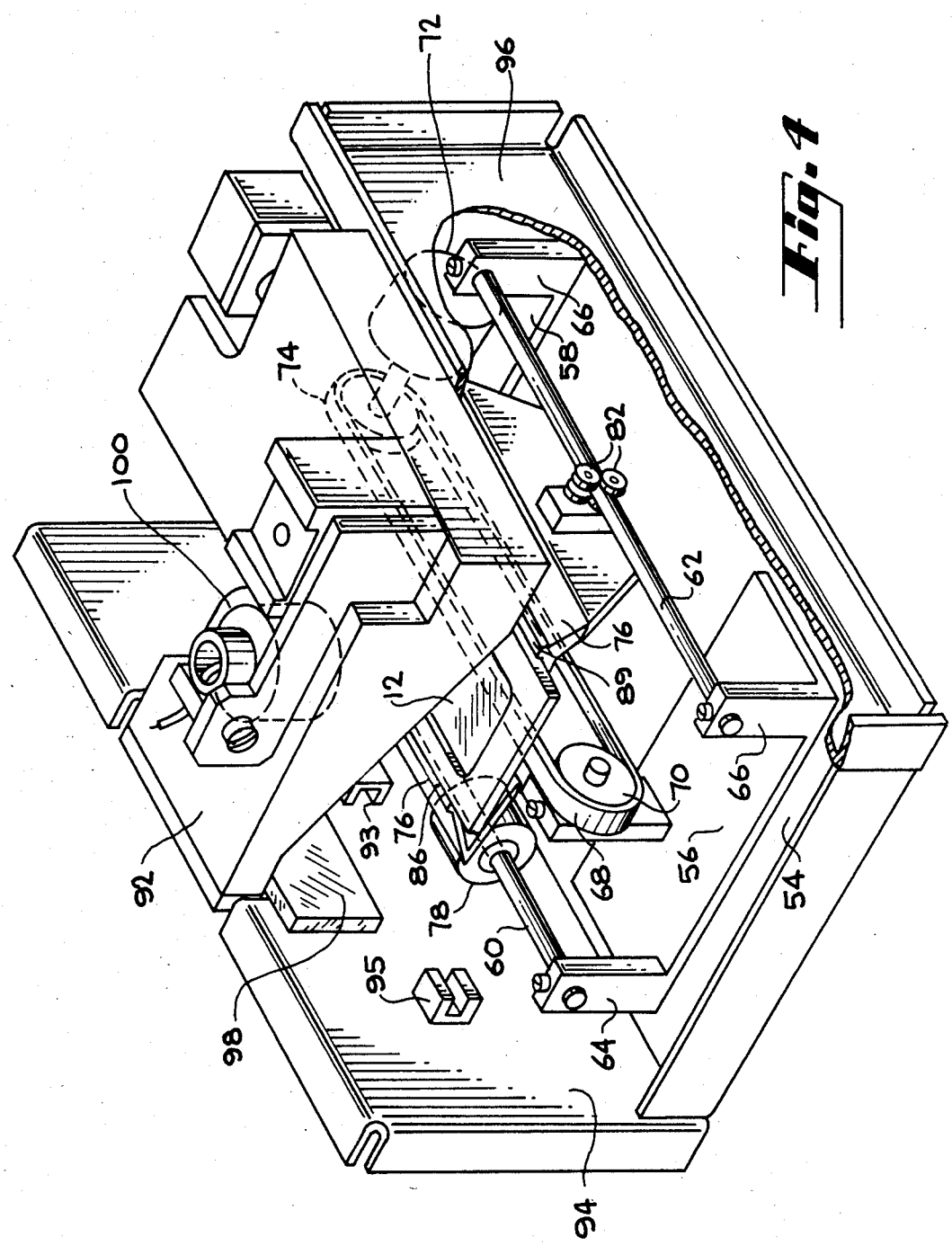
FIG. 4 is a perspective view of a card transport system used with the debit card of the present invention.

With reference to FIG. 4, the card transport has a base plate 54 which supports a frame having opposed frame members 56 and 58, mutually spaced apart, but connected by parallel rails 60 and 62. The rails are supported by upright arms 64 and 66. The frame also supports a drive belt 68 which is trained over idler pulley 70 and driven by a motor 72 through a drive pulley 74. Drive belt 68 is fixed to a movable carriage 76 which is carried on rails 60 and 62. On one side, the carriage is supported over the rails by annular bearing 78 and a second bearing at the opposite end of the carriage, while on the other side, guide bearings 82 are connected to either side of rail 62. The annular bearings are intended to support most of the load placed on the frame by the carriage while the guide bearings 82 are primarily intended to maintain the horizontal alignment of the carriage 76. The top of the carriage is flat, with a space defined between opposed ridges 84 and 86 for supporting a debit card 12. The debit card is intended to fit snugly between the ridges so that once it is in position, it cannot move about. A fixed bridge 92 is attached to side walls 94 and 96 which enclose the transport system. The bridge supports the fixed optical system and detectors used to read and write on the debit card.

To ensure that exact length of value is accurately read in the presence of dirt on the card, an off-card grating system is mounted on the card transport. Data from this grating, in conjunction with the calibration marks on the card, will minimize any error which might be introduced, for example, by card expansion, contraction, or skew. A movable grating on the transport moves relative to a fixed grating on side wall 94. Line crossings are counted to establish transport position. A limit switch 95 detects a movable member 93 carried by the card transport signalling a change in direction for motor 72.

Calibration of the decremented value sites is refined by the placement of a position measurement linear encoder on the card reader/writer. A Moire grating member 98 is mounted from the carriage 76 so as to move with the card. The other grating member, related optics and detection system are in a fixed position on the bridge 92. The off-card grating pattern can be used for interpolation between the calibration marks. Housing 100 holds the optics, detection system and light source, but not the grating and limit switch.

Figure 5:
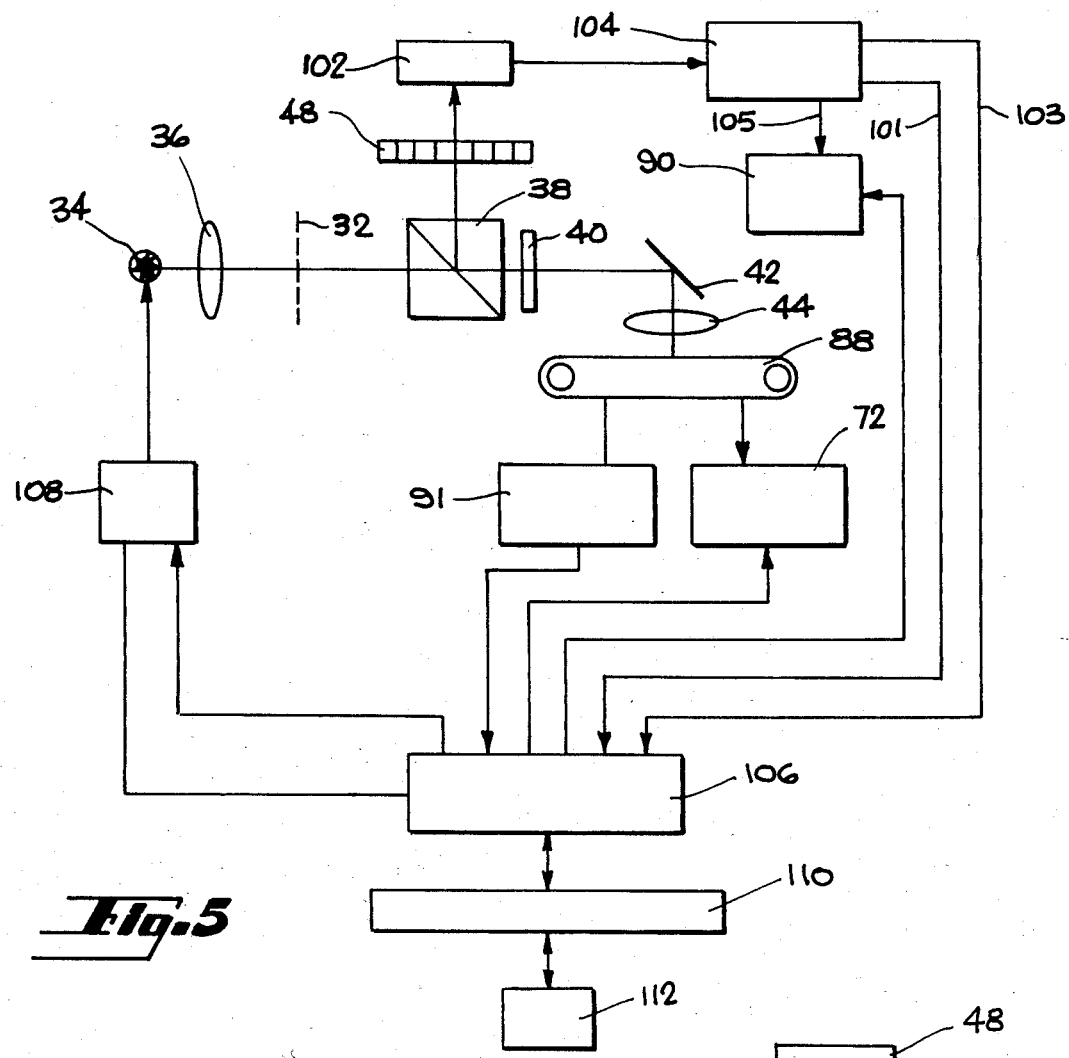
FIG. 5 is a block diagram of components of a reader/writer apparatus used with the debit card of FIG. 1.

Operation of the invention may be seen with reference to FIG. 5. The card transport 88 moves the card back and forth horizontally while a tracking mirror 42 and lens 44 control the crosswise position of the three beams on the card. The three beams originate from grating 32, illuminated by laser 34 and lens 36. The beams pass through beamsplitter 38 and quarter wave plate 40 before encountering mirror 42. Reflections of the three beams from the debit card are imaged onto a multi-element detector 48. Signals from the optical detector are amplified at amplifier 102 and pass to threshold circuit 104. The threshold circuit 104 evaluates whether the received signal, indicative of card value, has been decremented at a particular position and whether the received signal is on track. Card decrementing is known from the reflective or non-reflective character of the received signal. Card tracking is known from observation of a servo track and the generation of an error signal upon deviation from the track. Card position is known from the linear position encoder. Output signals on line 101, 103 and 105 contain position information for the card transport, as well as laser position and laser output information for laser 34. These signals are decoded by control logic 106 which operates transport driver 72 and laser driver 108 for moving the card and changing the read/write energy levels of the beams, as well as their position. A shuttle position measuring system 91 supplies position information from the grating to control logic 106. Position information from the image of the servo track is passed to the tracking servo 90 which can correct card position. Data is passed through a bus 110 to a central processing unit 112 which controls the entire system.

The shuttle may be driven at a fast speed, about 1 m/s, for reading and a slower speed for writing. The total transaction time can be decreased when debiting a small amount by running the shuttle at the higher speed until the card is positioned near the area to be debited.

The card is inserted into the system on to the card transport 88. The tracking mirror 42 advances the beams across the card until the first track guide 20 in FIG. 2 is encountered by the side tracking beam 30. The transport moves the card horizontally and the non-reflective decremented value site track 24 passes under the reading/writing beam 26. As soon as the end of the decremented track is reached, the shuttle slows down to writing speed and the energy level of the three beams is increased from reading power level to a level such that the middle beam reaches a level which can now alter the reflectance in the value site area 22, thereby increasing the decremented value site track 24 by a certain amount as determined by beam 28 on the calibration marks 18 and the linear encoder 91. After this, the energy level is dropped to a reading power level and the transport reaccelerates until the opposite end of the card is reached. The tracking mirror 42, by means of focusing lens 44, then moves the tracking beam 30 to servo track 21, the card motion is reversed and the procedure repeated for the redundant record in the other value site track 25. In all cases, the upper beam 28 scans the calibration marks 18. The information from these reflective marks is used to measure the length of the decremented amount with the linear encoder used for interpolation between the calibration marks. The information is also used for referencing the card position to the grating position.

While the preferred embodiment of the card has reflective preformatted areas and is read by reflection, an alternate embodiment having opaque or transparent areas could be read by detecting transmissivity through the card with the light beams and detectors on the transport placed on opposite sides of the card.

The debit card may be preformatted with redundant tracks recorded in the same value site area sharing parallel servo tracks as shown in FIG. 2 or alternately, the redundant tracks may be set in different value site areas with separate calibration marks and servo tracks. The width of the servo tracks may be adjusted to improve tracking sensitivity if necessary.

The preformatted consumable debit card provides self-tracking and self-calibrating means on an easily detectable optical material for decrementing value units without the need for complex optical reading and mechanical systems for detecting and decrementing value sites on the card. The card may be accurately produced by an inexpensive replication procedure.

We claim:

1. A consumable debit card comprising,
a support layer,
an optically recordable material adhered to said support layer, said material having preformatted optically detectable calibration marks and servo tracks and having an elongated optically recordable value site area proximate to said calibration marks and servo tracks, said calibration marks lying in a track parallel to said servo tracks and value site area, said calibration mark track and servo track and value site area in parallel alignment, the value site area having a width sufficient for optically decrementing two value site tracks in said value site area by following said servo tracks and calibration marks.

2. The card of claim 1 wherein said calibration marks, servo tracks and value site area are reflective, and said decremented value site tracks are pits having lower reflectivity than undecremented value sites.

3. The card of claim 1 wherein said calibration marks, servo tracks and value site area are opaque and said decremented value site tracks are transparent.

4. The card of claim 1 wherein a pair of servo tracks are placed proximate to a value site area and said calibration marks are of sufficient length to provide calibration for two decremented tracks in said value site area, each of said servo tracks providing servo tracking for one of said pair of decremented value site tracks.

5. A consumable debit card transaction system comprising,
(a) a card having parallel optically readable preformatted servo tracks and a track of calibration marks parallel to said servo tracks and having an optically recordable value site area between said servo tracks and the track of calibration marks, and
(b) a reader/writer apparatus for reading and recording on said card having a light energy source and detector means, and a transport means for moving said card back and forth in relation to said light source and detector.

6. The system of claim 5 further comprising means for splitting said light energy beam into three beams including one center beam for reading and writing on said optically recordable value site area and two side beams for following said servo tracks and said track of calibration marks.

7. The system of claim 5 further comprising a linear positioning encoder on said transport for interpolating distance on said card between said calibration marks.

8. A method of decrementing value sites on a debit card comprising,
(a) disposing an optically recordable value site area on a debit card and a pair of parallel optically detectable servo tracks proximate to said area and a track of optically detectable calibration marks also proximate to said area,
(b) moving said card in one direction and decrementing value sites from said area in a value site track formation from one edge of said area by altering the optically recordable surface by energy from a radiation source, said value site track being aligned by means of one said servo tracks, the length of said decrementing being measured by said calibration marks with reference to a grating,
(c) moving said card in the opposite direction and writing from the opposite edge of the card the same length of decremented value sites in a second value site track, said second value site track being aligned by a second of said servo tracks and the length of said decrementing being measured by said calibration marks with reference to the grating.

9. A method of decrementing value sites on a debit card comprising,
(a) disposing an optically recordable value site area on a debit card between a track of optically detectable calibration marks and a pair of parallel optically detectable servo tracks,
(b) decrementing by a desired amount, measured by said calibration marks with reference to a grating, value sites in a track formation from the value site area by alteration of the optically recordable surface, said track formation being aligned in said value site area by means of one of said parallel servo tracks,
(c) decrementing of the same amount on a second track in said value site area from an opposite end of said card by means of said calibration marks with reference to the grating and the second of said servo tracks so as to form two redundant recordings.

10. The method of claim 9 further defined by
(d) reading the amount of previously decremented value of one of said value site tracks by differences in the optical characteristics of the recordable surface,
(e) locating said decremented value by means of said calibration marks with reference to the grating,
(f) further decrementing said value site track by a desired amount, measured by said calibration marks with reference to the grating,
(g) repeating steps (d) through (g) on the second track of said decremented value sites from an opposite end of said card.

11. The method of claim 9 further defined by using a three-beam system for tracking, reading, writing and calibrating data on said debit card.

12. The method of claim 9 further defined by the use of a grating system to provide interpolation of the value of the space between said calibration marks.

* * * * *